United States Patent [19]
Martis

[11] Patent Number: 5,252,144
[45] Date of Patent: Oct. 12, 1993

[54] HEAT TREATMENT PROCESS AND SOFT MAGNETIC ALLOYS PRODUCED THEREBY

[75] Inventor: Ronald J. Martis, East Hanover, N.J.

[73] Assignee: Allied Signal Inc., Morris Township, Morris County, N.J.

[21] Appl. No.: 787,495

[22] Filed: Nov. 4, 1991

[51] Int. Cl.$^5$ ............................................. H01F 1/00
[52] U.S. Cl. ..................................... 148/121; 148/122
[58] Field of Search .................................. 148/121, 122

[56] References Cited

U.S. PATENT DOCUMENTS

| | | | |
|---|---|---|---|
| 4,081,298 | 3/1978 | Mendelsohn et al. | 148/121 |
| 4,116,728 | 9/1978 | Becker et al. | 148/121 |
| 4,219,355 | 8/1980 | DeCristofaro et al. | 75/123 B |
| 4,221,257 | 9/1980 | Narasimhan | 164/87 |
| 4,249,969 | 2/1981 | DeCristofaro et al. | 148/121 |
| 4,268,325 | 5/1981 | O'Handley et al. | 148/108 |
| 4,298,409 | 11/1981 | DeCristifaro et al. | 148/108 |
| 4,482,402 | 11/1984 | Taub | 148/121 |
| 4,510,489 | 4/1985 | Anderson et al. | 340/572 |
| 4,510,490 | 4/1985 | Anderson et al. | 340/572 |
| 4,525,222 | 6/1985 | Meguro et al. | 148/121 |
| 4,823,113 | 4/1989 | Hasegawa et al. | 340/551 |
| 4,834,815 | 5/1989 | Liebermann | 148/304 |
| 4,877,464 | 10/1989 | Silgaillis et al. | 148/122 |
| 4,881,989 | 11/1989 | Yoshizawa et al. | 148/302 |
| 4,985,088 | 1/1991 | Okamura et al. | 148/305 |

FOREIGN PATENT DOCUMENTS

| | | | |
|---|---|---|---|
| 3215263 | 11/1982 | Fed. Rep. of Germany | 148/121 |
| 56-2602 | 1/1981 | Japan | 148/121 |
| 62-18008 | 1/1987 | Japan . | |
| 63-29909 | 2/1988 | Japan . | |
| 3-075341 | 3/1991 | Japan . | |
| 2233345 | 1/1991 | United Kingdom . | |

OTHER PUBLICATIONS

K. Inomata et al., "Magnetostriction and Magnetic Core Loss at High Frequency in Amorphous Fe-based Alloys", *J. of Applied Physics* 8(IIA), p. 3572 (1985) Apr.
G. Herzer et al., "Surface Crystallization and Magnetic Properties of Amorphous Iron Rich Alloys", *J. of Magnetism and Magnetic Materials* 62, 143-151 (1986).
Domain Patterns and High Frequency Magnetic Properties of Amorphous Metal Ribbons, Wit and Brouha, *J. Appl. Physics*, 57 (1) 15 Apr. 85 pp. 3560-3562.
Introduction to Magnetic Materials, BD Cullity, Domains and the Magnetization Process 1972, pp. 333-341.
Perpendicular Anisotropy Induced in Fe-Ni Amorphous Ribbons Containing Phosphorus, Imamura & Sasaki, IEEE Transactions on Magnetics, vol. M AG-20 No. 5 Sep. 1984 pp. 1385-1387.
The Deleterious Effect of Aluminum in Fe-B-Si-C Amorphous Ribbon, Fiedler, Livingston, Huang. Gen Elec Co. Technical Inf. Series, No. 81CRD199, Aug. 1981, pp. 1-7.
Magnetic Domains, Anisotropies and Properties of Amorphous Metals, Livingston, Gen Elec. Tecnical Inf. Series, No. 85CRD146, Aug. 85 pp. 1-8.
Origin of the Perpendicular Anisotropy in Amorphous $FE_{82}B_{12}Si_6$ ribbons, Ok and Morrish, Physical Review B vol. 23, No. 5, Mar. 1981 pp. 2257-2261.

*Primary Examiner*—John P. Sheehan
*Attorney, Agent, or Firm*—Melanie L. Brown; Gerhard Fuchs; Karen A. Harding

[57] ABSTRACT

The present invention relates to a novel heat treatment process, and the alloy products produced thereby. The heat treatment process includes heating an alloy at a temperature and for a time sufficient to cause crystallization, cooling the alloy at a rate greater than about 10° C. per minute, preferably greater than about 50° C. per minute, and most preferably greater than about 100° C. per minute. Alloys of many compositions and having either amorphous, surface crystallized or partially bulk crystallized structure may be beneficially treated. Alloy strips and cores heat treated according to the present invention display B-H loops which display a discontinuous change in slope at near zero field conditions. Alloy strips which have been heat treated according to the present invention display greatly increased resonant output voltages and are particularly useful as resonant markers in article surveillance systems. Cores which have been heat treated according to the present invention display constant permeabilities up to about 1 MHz and are particularly useful as EMI filters and high frequency transformers.

9 Claims, 11 Drawing Sheets

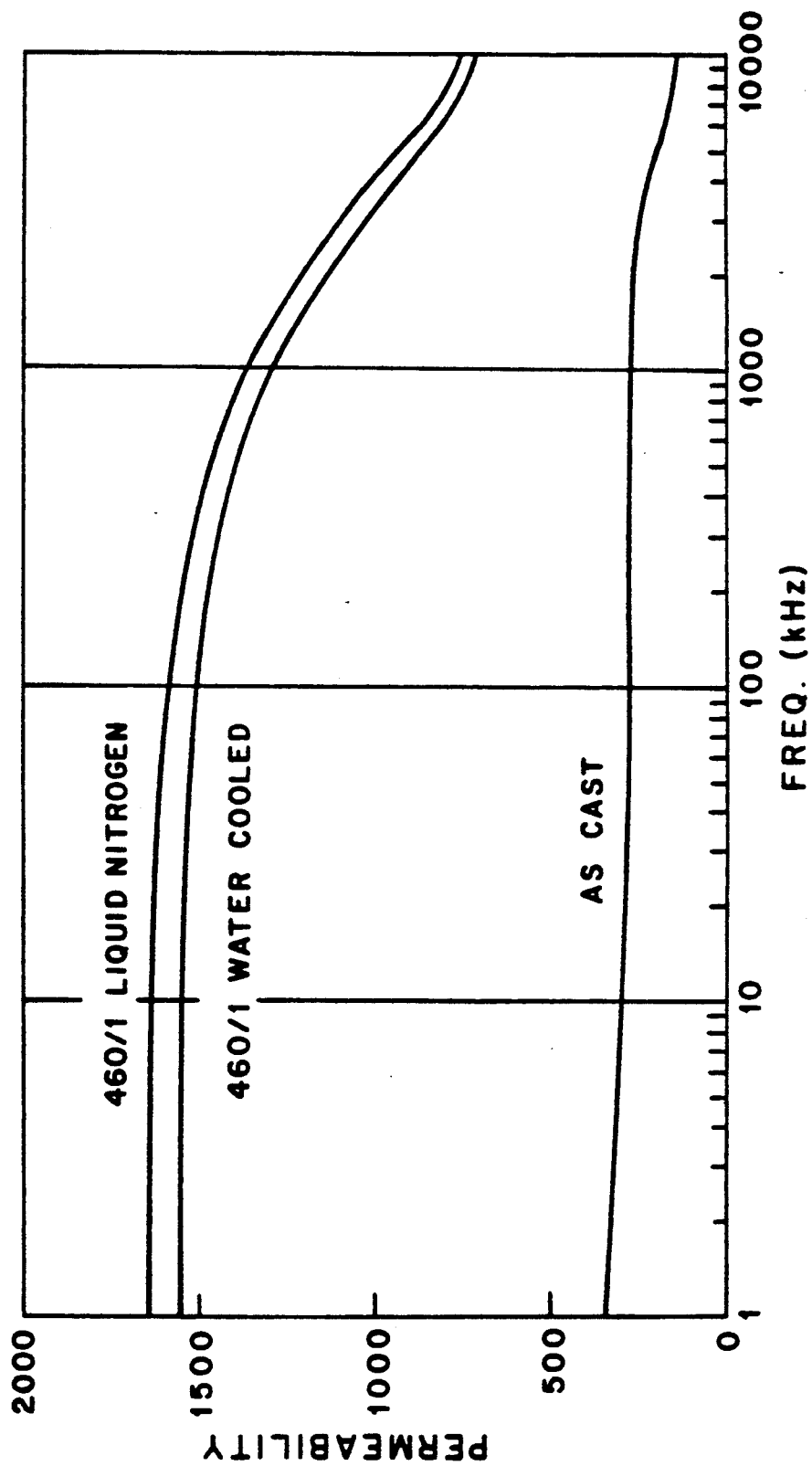

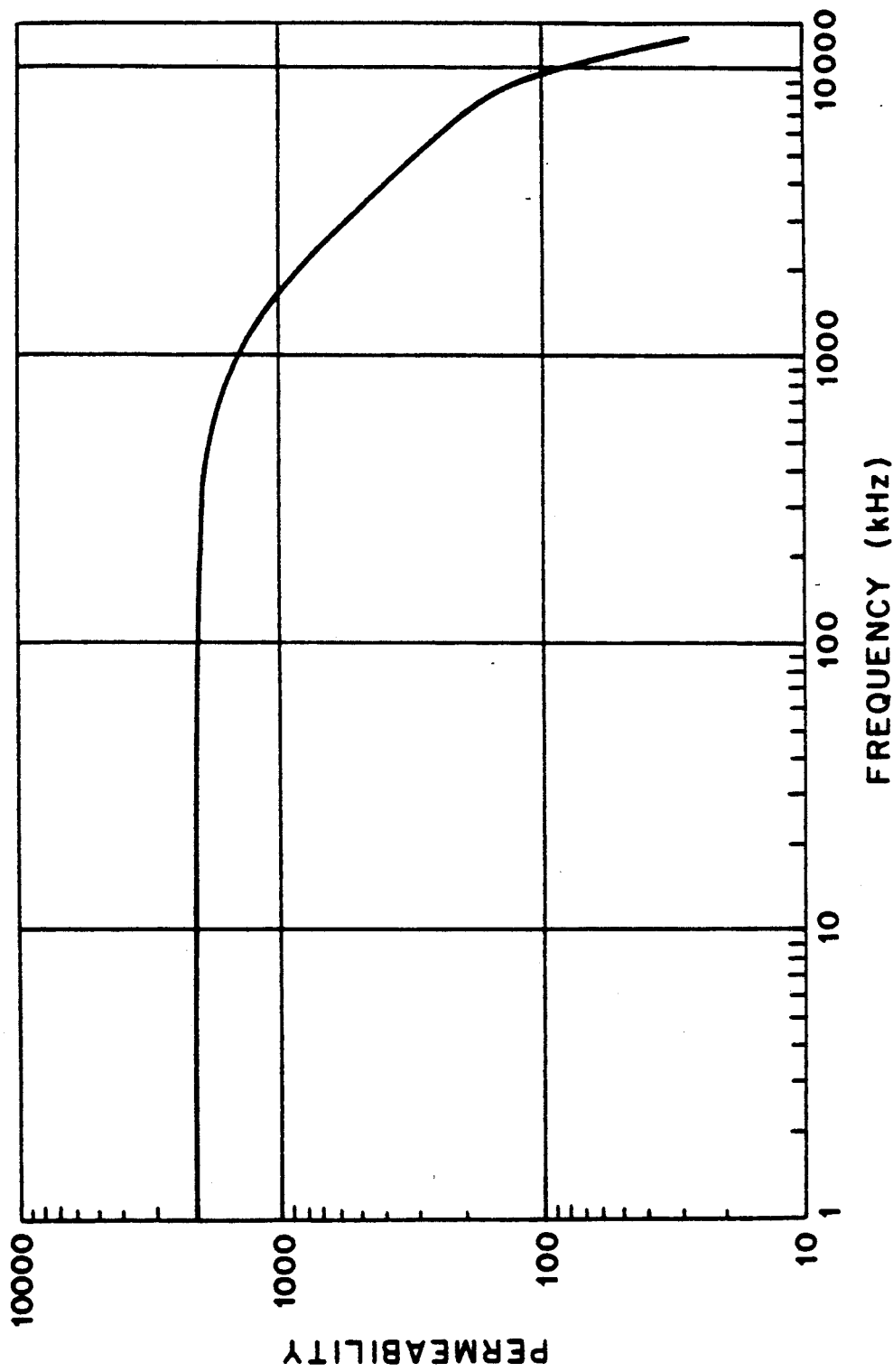

HEAT TREATMENT PROCESS AND SOFT MAGNETIC ALLOYS PRODUCED THEREBY

SUMMARY OF THE INVENTION

The present invention is directed to an improved heat treating process for enhancing the magnetic properties of magnetostrictive alloys. More specifically, the process includes an annealing step and a cooling step which is carried out at a rate greater than about 10° C. per minute. Alloy ribbons which are cut into strips, wound into cores, or which have any other shape may be annealed according to the present invention. Alloys which are heat treated according to the present invention in the form of strips display improved flatness and greatly enhanced resonant output voltages, which make them particularly useful for magneto-mechanical resonant applications such as resonant markers. Alloys which are heat treated in the form of cores display low core losses and essentially constant permeability over a wide range of frequencies, which make the heat treated cores particularly useful for EMI filters and high frequency transformers. Both alloy strips and cores annealed according to the present invention display pinched dc B-H loops. Regardless of the form, alloys which have been heat treated according to the present invention display crystalline and amorphous phases. Alloys having several different compositions may be heat treated according to the present invention.

BACKGROUND OF THE INVENTION

U.S. Pat. No. 4,823,113 discloses a ferromagnetic marker capable of generating both even and odd higher harmonics of the frequency of the exciting field, which is made from a glassy metal with Perminvar properties. Glassy alloys which can exhibit Perminvar characteristics have the composition $Co_aFe_bNi_cM_dB_eSi_f$, where M is at least one element selected from the group consisting of Cr, Mo, Mn and Nb, where "a" ranges from about 66 to 71 atomic %, "b" ranges from about 2.5 to 4.5 atomic %, "c" ranges from about 0 to 3 atomic %, "d" ranges from about 0 to 2 atomic % except when M=Mn in which case "d" ranges from about 0 to 4 atomic %, "e" ranges from about 6 to 24 atomic %, and "f" ranges from about 0 to 19 atomic %. The Perminvar characteristics are imparted by heat treating the alloy at a temperature between about 50° and 110° C. below the first crystallization temperature of the alloy for a time period between about 15 and 180 minutes and then cooling to room temperature at a rate slower than about −60° C./min. The '113 patent discloses that these alloys are particularly useful in the manufacture of harmonic tags.

Near-zero magnetostriction alloys having the composition $Co_{70.3}Fe_{4.7}Si_{15}B_{10}$ and annealed in the presence of an external field applied perpendicular to the ribbon plane to impart a hysteresis loop having a pinched, discontinuous change about the origin have been reported in *Domain Patterns and High-Frequency Magnetic Properties of Amorphous Metal Ribbons*, H. J. de Wit and M. Brouha, J.Appl.Phys., 57, 3560–63 (1985).

*Introduction to Magnetic Materials*, Addison-Wesley Publishing Co., B. D. Cullity, 1972, pg 340 discloses theoretically generated hysteresis loops having a pinched shape with an abrupt discontinuous change about the origin. B-H loops are proposed for each of the possible directions the magnetization could have in relation to the plane of the ribbon, but no process is disclosed for imparting a desired loop shape.

M. Imamura and T. Sasaki, *Perpendicular Anisotropy Induced in Fe-Ni Amorphous Ribbons Containing Phosphorus*, IEEE Transactions of Magnetics, MAG-20, 3185–87 (1985) discusses the origin of anisotropy perpendicular to the ribbon surface in Fe-Ni amorphous ribbons containing phosphorus. The anisotropy is induced via annealing in an $H_2$ or $N_2$ atmosphere, and was not observed in ribbons having Fe-Ni-B, Fe-B, Fe-Si-B or Co-Ni-Si-B compositions. The perpendicular anisotropy was attributed to a chemical change at the surface.

H. C. Fiedler, J. D. Livingston and S. C. Huang, *The Deleterious Effect of Aluminum in Fe-B-Si-C Amorohous Ribbon*, J. Mag. & Mag. Mat. 26, 157 (1982) attributed the degradation of the magnetic properties of the Fe-B-Si-C based alloys upon the presence a thin layer of crystalline material on the top surface of the as-cast ribbon which is believed to cause an out-of-plane anisotropy in the alloys.

J. D. Livingston, *Magnetic Domains, Anisotropies and Properties of Amorphous Metals*. GE Technical Information Series, Report No. 85CRD146, pg. 5 (August 1985) discloses introducing a magnetic easy axis normal to the ribbon plane by annealing the alloy strip in a large perpendicular field. The permeability of the annealed alloys is high at high frequencies. Upon annealing coercivity and hysteresis losses increase but eddy-current losses are reduced.

A number of patents disclose annealing metallic alloys which are at least about 90% amorphous and have compositions which are generally represented by $Fe_a\text{-}Co_bB_cSi_dC_e$. The alloys of U.S. Pat. No. 4,834,815 have about 75 to about 85 atomic % iron ("a"), about 0.1 to about 0.8 atomic % Co ("b"), about 12 to about 15 atomic % B ("c"), about 2 to about 5 atomic % Si ("d"), and about 1 to about 3 atomic % C ("e"). The alloys may be annealed at a temperature between about 300° C. and 400° C. The cooling rate is between about 0.5° C./min. and about 75° C./min, with about 10° C. to about 15° C./min. being most preferred. U.S. Pat. Nos. 4,219,335, 4,249,969 and 4,298,409 disclose alloys with compositions ranging from 80.0 to 82.0 atomic % iron ("a"), 12.5 to 14.5 atomic % boron ("c"), 2.5 to 5.0 atomic % silicon ("d") and 1.5 to 2.5 atomic % carbon. Each patent discloses an annealing step at temperatures between about 340° C. and 385° C., followed by a cooldown at a rate of about 0.5° C./min. to about 75° C./min., with a rate of about 1° C./min. to about 16° C./min. being preferred. The annealing step further reduces core loss and volt-ampere demand, making the alloys particularly suitable for use in transformer cores.

U.S. Pat. No. 4,268,325 discloses double annealing a magnetic glassy metal alloy sheet having a composition which is between 70 to 90 atomic % of at least one metal selected form the group consisting of iron and cobalt, up to about three-fourths of which may be replaced by nickel and up to about one quarter of which may be replaced by one or more metal selected from the group consisting of vanadium, chromium, manganese, copper, molybdenum, niobium, tantalum, and tungsten, and the balance at least one metalloid selected from the group consisting of boron, carbon and phosphorus, up to about three-fifths of which may be replaced by aluminum, plus incidental impurities. The first anneal is conducted between about 225° C. and the glass transition temperature, which is the temperature below which the viscosity of the glass exceeds $10^{14}$ poise. The second anneal is conducted at a temperature which is between about 25° C. and 100° C. lower than the first annealing temperature. The cooldown rate following the annealing step is between about 0.1° C./min and 100° C./min., and preferably between 0.5° C./min. and 5° C./min. The annealed magnetic glassy metal alloy sheets exhibit low magnetization losses making them particularly suitable for transformer cores.

U.S. Pat. No. 4,881,989 discloses near zero magnetostrictive alloys having the composition $(Fe_{1-a}M_a)_{100-x-y-z-\alpha}Cu_xSi_yB_zM'_\alpha$ and containing nanocrystalline structure and a process for making nanocrystalline alloys having low magnetostriction. The alloys are cast to form a substantially amorphous alloy, annealed at a temperature of about 550° C. for 1 hour, with or without an applied field and cooled. Cooling rates up to 600° C. per minute are disclosed. Low core losses were reported for wound cores annealed at 550° C. for 1 hour and cooled in air. Other cores annealed under same conditions gave a rounded dc loop.

BRIEF DESCRIPTION OF THE DRAWINGS

FIG. 10 is a graph of permeability as a function of frequency for cores having the composition $Fe_{40}Ni_{38}Mo_4B_{18}$ which were as-cast and heat treated under two different conditions.

FIG. 11 is a graph of permeability as a function of frequency for a core having the composition $Fe_{79.7}B_{10.9}Si_{9.4}$ and heat treated according to the present invention.

DETAILED DESCRIPTION OF THE INVENTION

Figure 1:
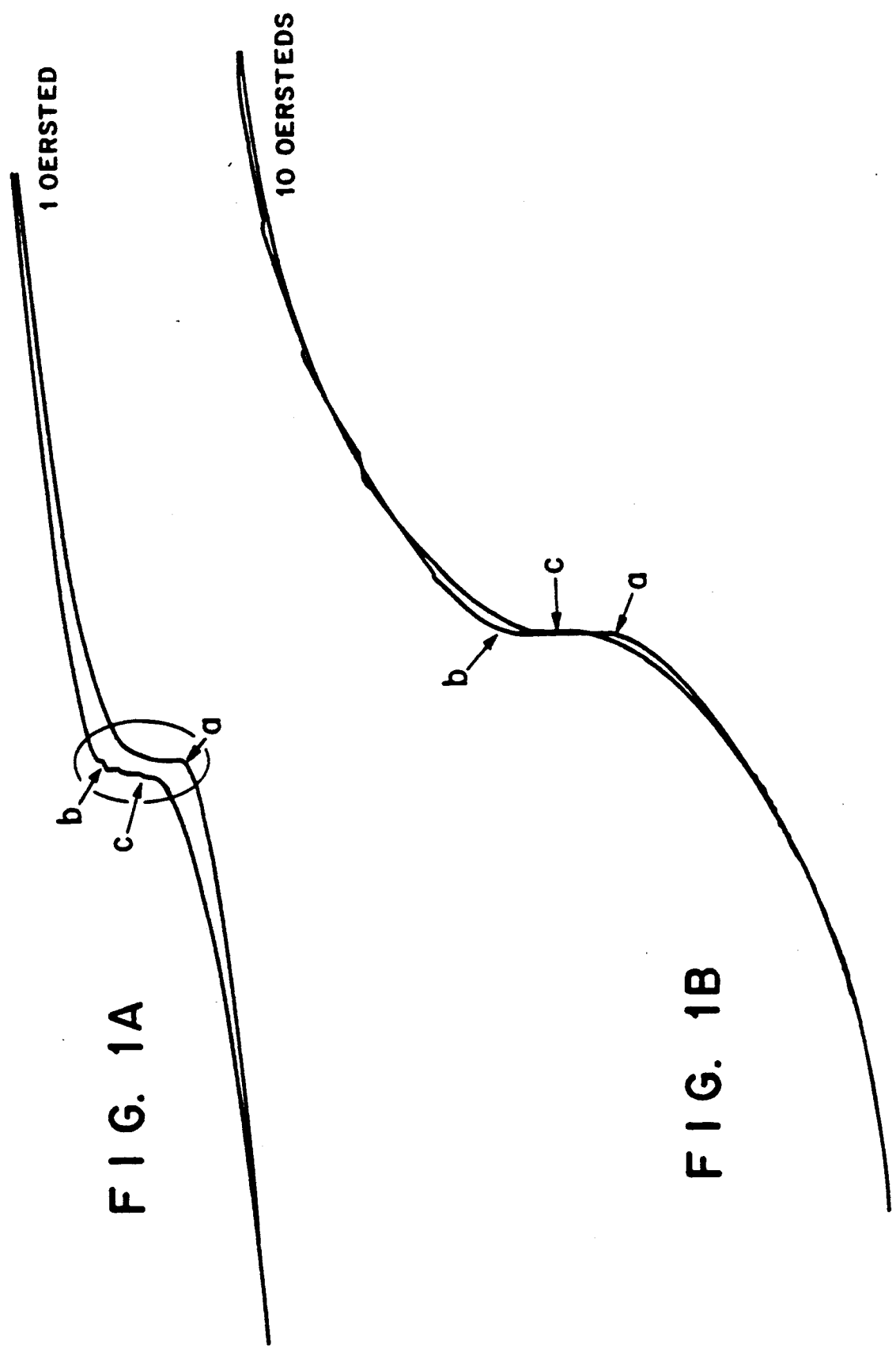
FIG. 1 is the dc loop of an as-cast alloy strip having the composition $Fe_{40}Ni_{38}Mo_4B_{18}$.

It has been found that by rapidly cooling an annealed alloy comprising crystalline and amorphous phases, the magnetic characteristics, particularly the resonant output voltage and dc B-H loop shape, can be altered. By heat treating certain alloys according to the present invention, alloys which display no output voltage prior to this heat treatment display significant resonant output voltages which are frequently in excess of about 100 after this heat treatment, and alloys which display some output voltage prior to this heat treatment exhibit an increase in resonant output voltage of up to 100%. Alloys which exhibit resonant output voltages of about 100 or more are preferred for use in magnetomechanical resonant article surveillance systems.

Alloys which may be beneficially treated according to the present application are positive magnetostrictive, soft magnetic materials. The saturation magnetostriction value is at least about 5 ppm, and preferably between about 5 ppm and about 35 ppm, which is exhibited by a variety of alloys including Fe, Co, Fe-Ni, Fe-Co and Fe-Co-Ni based metallic alloys. Alloys represented by the formula

$$Fe_aCo_bNi_cB_dSi_eM_f$$

wherein "a" is in the range of about 30 to about 85 atomic %, more preferably between about 35 and about 85 atomic %, "b" is in the range of 0 to about 45 atomic %, "c" is in the range of 0 to about 45 atomic %, "d" is in the range of about 10 to about 20 atomic %, "e" is in the range of 0 to about 20 atomic % respectively, with the sum of d+e preferably in the range of about 10 to about 30 atomic %, "f" is in the range of 0 to about 10 atomic % and the sum of a+b+c+d+e+f plus incidental impurities is essentially 100 are particularly preferred alloys suitable for treatment in accordance with the present invention.

The element "M" is one or more elements selected from the group consisting of elements in groups IVA, VA and VIA of the (IUPAC) periodic table. Further, P or C may also be present in the alloy, as replacements for B or Si, in amounts up to those specified for "d+e" above. Examples of commercially available alloys within the above recited formula include alloys having the nominal compositions $Fe_{78}B_{13}Si_9$, $Fe_{80}B_{11}Si_9$, $Fe_{81}B_{13.5}Si_{3.5}C_2$, $Fe_{77}Cr_2B_{16}Si_5$, $Fe_{66}Co_{18}B_{15}Si_1$, $Fe_{74}Ni_4Mo_3B_{17}Si_2$, $Fe_{40}Ni_{38}Mo_4B_{18}$.

The alloys benefiting from the process of the present invention are most preferably produced by rapidly quenching the molten alloy on a chill surface, such as a rotating cylinder as disclosed in U.S. Pat. No. 4,221,257, incorporated herein by reference.

Alloys which may be heat treated according to the present invention may be amorphous alloys, surface crystallized amorphous alloys or partially bulk crystallized alloys. Amorphous alloys contain no long range crystalline order. Surface crystallized amorphous alloys contain a substantially amorphous structure with a crystalline phase at the surface (approximately the top 5 to 10 μm) of an alloy strip typically having thickness of about 20 to about 25 μm. Surface crystallinity may be imparted on the alloy during casting, or via annealing, and may be enhanced by the addition of certain elements, such as Al or Cu, to the alloy melt or via any other method known in the art. Partially bulk crystallized alloys have a crystalline phase distributed throughout an amorphous metal matrix. Alloys containing nanocrystalline particles are an example of partially bulk crystallized alloys and are disclosed in, for example, U.S. Pat. Nos. 4,985,088, 4,881,989 and in U.S. application Ser. No. 665,369. In addition, the annealing step of the heat treatment of the present invention may be used to introduce surface or partial bulk crystallization to an amorphous alloy.

In the preferred embodiment essentially amorphous alloys are annealed to impart crystallinity to the alloy. The type of crystallinity which results depends upon the composition of the alloy. Inclusion of certain elements such as Mo, Cu, Nb, etc. seem to be essential for the formation of nanocrystalline particles. For example, the alloy having the nominal composition $Fe_{40}Ni_{38}Mo_4B_{18}$ can, because it exhibits significantly spaced apart peak crystallization temperatures and contains Mo, display partial bulk crystallization in the form of nanocrystalline particles which are dispersed throughout an amorphous matrix upon annealing. Fe base alloys which are annealed below the first peak crystallization temperature are likely to display surface crystallization.

Any combination of time and temperature may be used for the annealing step so long as the annealed alloy displays crystallization. For alloys, such as the alloy having the composition $Fe_{40}Ni_{38}Mo_4B_{18}$, which displays a first crystallization temperature at which nanocrystalline particles are formed and a second crystallization temperature where a second crystalline phase is formed, the annealing step is preferably carried out at any temperature below the onset of the second crystallization temperature. More preferably the anneal is carried out at a temperature which is between the onset of the first crystallization temperature and the temperature which is the midpoint between the onsets of the first and second crystallization temperatures.

Alloys which display a single broad peak crystallization temperature or closely spaced apart crystallization temperatures are annealed at a temperature which is between about 60% and about 99% of the first peak crystallization temperature for the specific alloy being annealed to induce surface crystallization. Preferably the temperature is between about 70% and about 95% of the first peak crystallization temperature, and most preferably the annealing temperature is between about 80% and about 90% of the first peak crystallization temperature. However, alloys which are annealed at optimum temperatures may be under or over annealed if the length of the anneal is either too short or too long respectively.

The length of the anneal (for alloys displaying either type of crystallinity) of "hold time" will depend on the annealing temperature, and may be any time from about 15 minutes to about 5 hours, and preferably is between 15 minutes and 2 hours. When utilizing temperatures which are close to the first peak crystallization temperature the annealing time is relatively short. Anneals which are conducted at low temperatures may be continued for a longer period of time. Thus, generally, as the annealing temperature is increased, the annealing time may be decreased.

Preferably, the starting alloy is "quick annealed". Quick annealing may be achieved by preheating an oven to the desired annealing temperature and then placing the alloy in the oven for annealing. Any other method which would result in an annealing step having a rapid heating rate (about 150° C./minute) can also be used.

Alloys containing crystalline and amorphous phases may also be heat treated according to the present invention. Alloys which display partial bulk crystallization prior to heat treatment are annealed at a temperature which is above the first Curie temperature of the crystallized alloy, but below the second crystallization temperature of the amorphous alloy. Alloys which display surface crystallization are heated to an appropriate annealing temperature for a non-crystallized alloy. Precrystallized alloys are then cooled as described below. The "hold time" employed is, most preferably insufficient in combination with the annealing temperature to further induce crystallization or enable any significant growth of existing crystalline structure. Surprisingly it has been found that hold times utilized for amorphous alloys also produce the best properties on precrystallized alloys. Accordingly, the hold times between 15 minutes and 2 hours are preferred. Alloys which have been previously annealed to induce crystallization, or to which limited crystallinity has been imparted during casting, may be annealed as described above. Regardless of the form of the alloy prior to heat treatment, it is necessary to optimize the conditions of the annealing step to maximize the properties of the heat treated alloy.

Surface crystallization results in a higher density layer than the amorphous bulk. This higher density surface layer generates biaxial compressive stresses in the amorphous bulk. The biaxial compressive stresses induced by the surface crystallized layer, coupled with the positive magnetostriction of the alloy, lead to an out-of-plane anisotropy in the bulk. However, the tensile stresses within the crystallized layer leads to in-plane anisotropy in the crystallized layer (H. N. Ok & A. H. Morrish, Physical Review, B23, 2257 (1981, and G. Herzer & H.R. Hilziner, J. Of Mag. & Mag. Materials 62, 143 (1986)).

It is believed that rapid cooling suppresses the in-plane anisotropy in the crystalline layer leading to anisotropy which is dictated predominantly by the amorphous bulk of the ribbon. To achieve the suppression of the in-plane anisotropy the annealed alloy is cooled at a rate greater than about 10° C. per minute. Preferably the alloy is cooled at a rate greater than about 50° C. per minute, and more preferably at a rate greater than about 100° C. per minute. Most preferably, the annealed alloys are removed from the oven and cooled in either air (cooling rate of about 170° C./min), water (cooling rate of about 2300° C./min. to room temperature) or liquid gas, e.g. nitrogen (cooling rate of about 2300° C./min.) to room temperature).

It is believed that the mechanism for alloys having a nanocrystalline phase distributed throughout an amorphous matrix is similar. Interactions between the magnetostrictions of the amorphous and crystalline phases and stresses caused by the presence of two phases after heat treatment according to the present invention lead to an out-of-plane anisotropy.

The resulting alloys display several unique properties compared to alloys of the same composition which have not been so heat treated. First, alloys heat treated according to the present invention display a B-H loop which has a discontinuous changes at near zero field conditions, such as a loop which is pinched or narrow about the origin. B-H loops of this shape are typically displayed by the as-cast alloy $Fe_{40}Ni_{38}Mo_4B_{18}$, and by near zero magnetostrictive alloys which are annealed in a field which is perpendicular to the plane of the strip being annealed. It is believed that the above-described loop displayed by magnetostrictive alloys heat treated according to the present invention indicates the presence of a magnetization component transverse to the ribbon length (either perpendicular to the major surface of the ribbon or parallel to the width of the ribbon).

The alloys heat treated according to the process of the present invention also display greatly improved resonant output voltages when compared to their as-cast counterparts. Accordingly, alloy strips which have been heat treated according to the present invention are particularly useful as resonant markers for use in article surveillance systems. Such markers typically comprise at least one alloy strip and a housing as described in U.S. Pat. Nos. 4,510,489 and 4,510,490, and incorporated herein by reference. Resonant output voltage is typically measured using the following procedure: Alloy strips are placed inside exciting and sensing coils; An ac magnetic field of about 1.1 $V_p$ is applied along the longitudinal direction of each metal strip with a dc biasing field of about 345 A/m; The dc biasing field is applied by a pair of Helmholtz coils; The sensing coil detects the magnetomechanical response of the metal strip to the ac excitation; The ac excitation frequency is varied automatically by increments of 0.1 kHz starting at 53 kHz and going up to 63 kHz; The frequency corresponding to the maximum amplitude is recorded as the resonant frequency; If the amplitude is nearly zero in this range a default value of 63.0 kHz is recorded as the resonant frequency; The amplified output equivalent at about 1 msec after the termination of the exciting ac field is measured. For alloy strips whose resonant output voltages were measured in this way increases in resonant output voltage between about 50 and about 190 have been achieved. Alloys which had no resonant voltage output prior to heat treatment, display significant resonant output voltages, frequently up to and in excess of 100 after heat treatment. Alloys which display resonant output voltages prior to heat treatment according to the present invention (such as $Fe_{40}Ni_{38}Mo_4B_{18}$), show increases in the resonant output voltage of up to about 100% after such treatment.

Because of the high resonant output voltages which may be achieved via the heat treatment process of the present invention, the resulting alloys strips have particular utility as resonant markers in article surveillance systems.

In addition to heat treating alloy strips, the alloy strips may be wound into cores and then heat treated according to the present invention. Cores may be heat treated at the same temperatures as an alloy strip of the same composition. Accordingly, cores made from alloys displaying surface crystallization upon annealing may be annealed at any temperature between about 60% and about 99% of the first peak crystallization temperature of the alloy. Preferably the temperature is between about 70% and about 95% of the first peak crystallization temperature, and most preferably the annealing temperature is between about 80% and about 90% of the first peak crystallization temperature. Cores made from alloys displaying bulk or partial bulk crystallization (such as nanocrystalline structure) may be annealed at any temperature which is below the onset of the second crystallization temperature, and more preferably at a temperature which is between the onset of the first crystallization temperature and the temperature which is the midpoint between the onsets of the first and second crystallization temperatures.

Times for annealing cores are determined in the same manner as discussed above for alloy strips, and may be readily determined by one skilled in the art using the teachings of the present invention.

Cores which are heat treated according to the present invention also display dc B-H loops which have discontinuous changes in the loop at near zero field conditions, and may be pinched or narrow about the origin, but most importantly exhibit an increased and essentially constant permeability up to high frequencies (about 1 MHz). Cores produced in accordance with the present invention are particularly useful as EMI filters and high frequency transformers.

The following examples are meant to be illustrative and not enumerative. Various changes may suggest themselves to one skilled in the art. The true spirit and scope of the present invention should be determined by reference to the appended claims, and should not be limited by the following examples.

EXAMPLE 1

A metallic alloy having a composition of $Fe_{79.7}B_{10.9}Si_{9.4}$, and having saturation magnetostriction constant of about 27 ppm, was cast into a ribbon via planar flow casting, and cut into strips measuring 0.5 inches by 1.5 inches. Fifty strips were placed in a Blue M oven. The oven was heated to 440° C. in about one hour. The strips were annealed at 440° C. for 1 hour and the oven was cooled at a rate of 6° C./min. Each of the annealed metal strips was placed in a sensing coil which detected the magnetomechanical response of the metal strip to the ac excitation. The magnetomechanical response, resonant frequency ($f_r$) and output voltage($V_1$) at 1 msec after the termination of the exciting ac field were measured. The results are listed in the first row of Table 1, below.

Fifty strips were annealed for 1 hour in a Lindberg tube oven which was preheated to 440° C. The strips were cooled at a rate of 48° C./min. The resonant frequency and output voltage of the strips were measured as above, and are listed in the second row of Table 1.

Fifty strips having the same composition were annealed in a Lindberg oven as above and then cooled at a rate of 80° C./min. The resonant frequency and output voltage of the strips were measured as above, and are listed in the third row of Table 1.

Fifty strips were annealed as above, and then removed from the Lindberg oven and cooled in air. The resonant frequency and output voltage are listed in the fourth row of Table 1.

The sensing equipment was set to measure resonant frequencies between 53 kHz and 63 kHz. If the resonant output is near-zero in this frequency range a default value of 63 kHz is recorded as the resonant frequency, and is recorded herein as "*".

TABLE 1

| RUN NO. | CONDITIONS | $Fe_{79.7}B_{10.9}Si_{9.4}$ COOLING RATE | RES. FREQ (kHz) | OUTPUT |
|---|---|---|---|---|
| 1 | 440° C./1 hr | 6° C./min Blue M oven | * | 0 |
| 2 | 440° C./1 hr | 48° C./min Lindberg | 61.4 ± 0.7 | 54 ± 45 |
| 3 | 440° C./1 hr | 80° C./min Lindberg | 61.0 ± 0.6 | 82 ± 43 |
| 4 | 440° C./1 hr | Air cooled Lindberg | 59.7 ± 0.6 | 154 ± 36 |

Comparing the output voltages of the strips which were cooled at different cooling rates, it is clear that the strips which were rapidly cooled (48° C./min or faster) according to the present invention display significantly improved output voltages as compared to those cooled at the conventionally preferred cooling rate (6° C./min.).

EXAMPLE 2

Alloys having a composition $Fe_{40}Ni_{38}Mo_4B_{18}$ and a saturation magnetostriction constant of about 12 ppm were cast and cut as in the previous example. Fifty strips were annealed at 460° C. for 1 hour. The alloy strips were cooled at different cooling rates, and the resonant frequency and output voltage were measured as in Example 1. Cooling rates, resonant frequencies, $f_r$, output voltages, $V_1$ and standard deviations are listed in Table 2 below.

TABLE 2

$Fe_{40}Ni_{38}Mo_4B_{18}$

| RUN NO. | CONDITIONS | COOLING RATE | $f_r$ (kHz) | $V_1$ |
|---|---|---|---|---|
| 5 | 460° C./1 hr | 6° C./min Blue M oven | 60.3 ± 0.7 | 39 ± 14 |
| 6 | 460° C./1 hr | 48° C./min Lindberg oven | 61.3 ± 0.2 | 203 ± 18 |
| 7 | 460° C./1 hr | 80° C./min Lindberg oven | 61.2 ± 0.6 | 214 ± 16 |

As was shown with the strips annealed in Example 1, it is clear that amorphous alloy strips having a composition $Fe_{40}Ni_{38}Mo_4B_{18}$ show greatly increased output voltages when heat treated according to the present invention.

EXAMPLE 3

Alloys having a composition $Fe_{40}Ni_{38}Mo_4B_{18}$ were cast and cut as in the previous example. Alloys having the above composition display two onset of crystallization temperatures $T_{x1}$ at 439° C. and $T_{x2}$ at 524° C. Each run contained 50 alloy strips. The resonant frequency, $f_r$, and output voltage, $V_1$, of the as-cast strips were measured as in Example 1 and are listed below in Table 3. Standard deviation was calculated for each run and is listed with the resonant frequency and output voltage.

TABLE 3

| Run Number | BEFORE ANNEALING | |
|---|---|---|
| | $f_r$ (kHz) | $V_1$ |
| 8 | 57.2 ± 0.1 | 112 ± 29 |
| 9 | 57.2 ± 0.1 | 101 ± 15 |
| 10 | 57.0 ± 0.1 | 157 ± 7 |
| 11 | 57.4 ± 0.1 | 162 ± 9 |
| 12 | 57.3 ± 0.1 | 163 ± 6 |

The metal strips were then annealed in a Lindberg over preheated to 460° C. for the time indicated in Table 4, below. The allow strips were removed from the oven and cooled in liquid nitrogen. The resonant frequency and output voltage were measured as above, and the results, including standard deviations, are shown in Table 4.

TABLE 4

| Run Number | Anneal Cond. | AFTER ANNEALING | |
|---|---|---|---|
| | | $f_r$ (kHz) | $V_1$ |
| 8 | 460° C./1 hr | 60.6 ± 0.31 | 140 ± 45 |
| 9 | 460° C./1 hr | 60.7 ± 0.17 | 197 ± 38 |
| 10 | 460° C./1 hr | 61.0 ± 0.39 | 210 ± 31 |
| 11 | 460° C./1 hr | 61.2 ± 0.40 | 211 ± 22 |

TABLE 4-continued

| Run Number | Anneal Cond. | AFTER ANNEALING | |
|---|---|---|---|
| | | $f_r$ (kHz) | $V_1$ |
| 12 | 460° C./1 hr | 62.5 ± 0.14 | 144 ± 17 |

By comparing the output voltages listed in Tables 3 and 4 it is clear that alloy strips of the above composition may be beneficially heat treated with only minimal optimization. Optimum conditions for alloys were 460° C. for 1 hour (runs 8–11), each of those runs show substantial increases in output voltage after annealing. The post annealing decrease in output voltage displayed by run 12 indicated that the optimum annealing conditions had been exceeded.

EXAMPLES 4–6

Each of the alloys (each having a saturation magnetostriction constant of about 27 ppm) listed in Table 5, below, was melted, cast and cut as in Example 1. The first peak crystallization temperature ($T_{x1}$) for each alloy composition is also listed. Fifty strips were heat treated in each run. Each of the strips was heat treated according to the conditions (annealing temperature, time and cooling rate) indicated in Table 5.

TABLE 5

| Run No. | Alloy Comp. | $T_{x1}$ (°C.) | Annealing Cond. | Cooling Cond. |
|---|---|---|---|---|
| 13 | $Fe_{78}B_{13}Si_9$ | 553 | 460° C.-½ hr | 6° C./min |
| 14 | $Fe_{78}B_{13}Si_9$ | 553 | 460° C.-½ hr | liq. $N_2$ |
| 15 | $Fe_{78}B_{13}Si_9$ | 553 | 460° C.-½ hr | Air |
| 16 | $Fe_{78}B_{13}Si_9$ | 553 | 460° C.-1 hr | liq. $N_2$ |
| 17 | $Fe_{79.7}B_{10.9}Si_{9.4}$ | 515 | 440° C.-½ hr | liq. $N_2$ |
| 18 | $Fe_{79.8}B_{10.9}Si_{9.3}$ | 513 | 460° C.-15 min | liq. $N_2$ |
| 19 | $Fe_{79.8}B_{10.9}Si_{9.3}$ | 513 | 440° C.-½ hr | liq. $N_2$ |

The resonant frequency and output voltage of each strip was measured both before and after annealing, using the method described in Example 1 and the results are listed in Table 6.

TABLE 6

| Run Number | BEFORE | | AFTER | |
|---|---|---|---|---|
| | $f_r$ (kHz) | $V_1$ | $f_r$ (kHz) | $V_1$ |
| 13 | * | 0 | * | 0 |
| 14 | * | 0 | 57.4 ± 1.8 | 105 ± 43 |
| 15 | * | 0 | 59.4 ± 2.0 | 102 ± 51 |
| 16 | * | 0 | 59.0 ± 0.2 | 188 ± 25 |
| 17 | * | 0 | 55.9 ± 1.0 | 170 ± 45 |
| 18 | * | 0 | 59.7 ± 0.3 | 105 ± 13 |
| 19 | * | 0 | 57.3 ± 0.6 | 176 ± 23 |

All of the alloys displayed output voltages of zero prior to annealing. The alloy strips of run number 13 were annealed and cooled under conventional conditions (6° C./min.). No output voltage was observed. All of the alloys cooled according to the process of the present invention show dramatic increases in output voltage (run 15 with the lowest average $V_1$ increased from 0 to 102±51; and run 16 with the highest average $V_1$ increased from 0 to 188±25). Further, runs 14 through 16 of strips having the same composition where only the annealing time and cooling medium had been varied illustrate that longer annealing time and lower annealing temperature yielded alloy strips displaying a higher average output voltage. Thus, the annealing conditions (460° C. for 1 hour) appeared closer to optimum annealing conditions than the conditions used in runs 14 for the alloy having the same composition, $Fe_{78}B_{13}Si_9$. Runs 17-19 illustrate the effects of the present invention, i.e., unexpectedly high average output voltages, but also indicate the effects of overannealing strips. Strips of run 18 were annealed for 15 minutes at 460° C. Annealing at these conditions (about 90% of the first peak crystallization temperature) exceeds the apparent optimum annealing temperature of 440° C. (run 19, corresponding to about 85% of the first peak crystallization temperature), but nonetheless produced dramatic improvement in output voltage response as compared to an alloy of the same composition not subjected to heat treatment in accordance with the present invention.

Heat treated strips from run 17 ($Fe_{79.7}B_{10.9}Si_{9.4}$) were analyzed by X-ray diffraction. Crystalline peaks due to α-Fe were observed. Grinding of the dull side of the alloy strips resulted in a decrease in the crystalline index on that side, demonstrating that crystallinity was limited to the surface of alloy strips having the composition $Fe_{79.7}B_{10.9}Si_{9.4}$.

Accordingly, alloys of the above compositions heat treated according to the present invention produce an alloy strip having a dramatically improved output voltage.

EXAMPLE 7

Alloy strips having the composition $Fe_{74}Ni_4Mo_3B_{1.7}Si_2$, displaying a peak crystallization temperature of 522° C. and a saturation magnetostriction constant of about 19 ppm were annealed in fifty strip lots. The annealing and cooling conditions are listed below in Table 7 and the resonant frequency (kHz) and output voltage before and after annealing are listed in Table 8.

TABLE 7

| RUN NO. | CONDITIONS | |
|---|---|---|
| | ANNEAL | COOL |
| 20 | 420° C./2 hr | AIR |
| 21 | 420° C./2 hr | LIQ. $N_2$ |
| 22 | 460° C./1 hr | AIR |
| 23 | 460° C./1 hr | LIQ. $N_2$ |
| 24 | 480° C./15 min | AIR |
| 25 | 480° C./15 min | LIQ. $N_2$ |
| 26 | 480° C./1 hr | AIR |
| 27 | 480° C./1 hr | LIQ. $N_2$ |

TABLE 8

| RUN NO. | AS-CAST FREQ. | AS/CAST OUTPUT | ANNEALED FREQ. | ANNEALED OUTPUT |
|---|---|---|---|---|
| 20 | 62.6 ± 1.3 | 0.4 ± 1 | 61.5 ± 3.6 | 1 ± 2 |
| 21 | 62.2 ± 1.8 | 1 ± 3 | * | 0 |
| 22 | 60.8 ± 2.7 | 3 ± 5 | 60.2 ± .3 | 88 ± 18 |
| 23 | 62.4 ± 1.8 | 1 ± 3 | 60.0 ± .4 | 76 ± 25 |
| 24 | 61.0 ± 2.7 | 2 ± 4 | 59.7 ± 0.7 | 30 ± 15 |
| 25 | 60.9 ± 2.8 | 2 ± 2 | 59.9 ± 0.2 | 22 ± 7 |
| 26 | 60.6 ± 2.5 | 3 ± 5 | * | 0 |
| 27 | 60.5 ± 2.6 | 2 ± 2 | * | 0 |

The alloys heat treated at low temperatures (runs 20 and 21) were under-annealed, and accordingly did not show any improvement in output voltage after heat treatment. The alloys heat treated at 460° C. for an hour (runs 23 and 24) showed dramatic increases in output voltage upon heat treatment. Runs 24 and 25 showed smaller output voltages than those for runs 22 and 23 which indicated that the alloys were somewhat overannealed. The remaining runs (26 and 27) showed no improvement in output voltage after heat treatment indicating that acceptable annealing conditions had been exceeded. Accordingly, the optimum annealing conditions for alloys having the composition $Fe_{74}Ni_4Mo_3B_{1.7}Si_2$ were about 460° C. for about 1 hour.

EXAMPLE 8

Alloy strips having the composition $Fe_{81}B_{13.5}Si_{3.5}C_2$, a first peak crystallization temperature 509° C. and having a saturation magnetostriction constant of about 30 ppm were heat treated in fifty strip lots (except for runs 32 and 33 which were heat treated in 25 strip lots) under the conditions listed below in Table 9.

TABLE 9

| RUN NO. | CONDITIONS | |
|---|---|---|
| | ANNEAL | COOL |
| 28 | 420° C./15 min | AIR |
| 29 | 420° C./15 min | LIQ. $N_2$ |
| 30 | 420° C./30 min | AIR |
| 31 | 420° C./30 min | LIQ. $N_2$ |
| 32 | 420° C./1 hr | AIR |
| 33 | 420° C./1 hr | LIQ. $N_2$ |
| 34 | 440° C./15 min | AIR |
| 35 | 440° C./30 min | AIR |

The resonant frequency (kHz) and output voltage were measured before and after heat treatment, and are shown in Table 10.

TABLE 10

| RUN NO. | AS-CAST FREQ. | AS/CAST OUTPUT | HEAT TREATED FREQ. | HEAT TREATED OUTPUT |
|---|---|---|---|---|
| 28 | * | 0 | * | 0 |
| 29 | * | 0 | * | 0 |
| 30 | * | 0 | * | 0 |
| 31 | * | 0 | * | 0 |
| 32 | * | 0 | 53.3 ± 1.0 | 72 ± 21 |
| 33 | * | 0 | 57.3 ± 4.9 | 4 ± 5 |
| 34 | * | 0 | 53.3 ± 1.4 | 21 ± 9 |
| 35 | * | 0 | 58.4 ± .3 | 162 ± 35 |

The output voltages listed in the last column of Table 10 indicated that the alloy having the composition $Fe_{81}B_{13.5}Si_{3.5}C_2$ can benefit significantly when treated according to the process of the present invention, expecially under the heat treatment conditions of run 35. Run 33 is reported for completeness but is not believed representative of the invention; rather it is believed to be an aberration. The reason for this decrease in output voltage is not known.

EXAMPLE 9

The output voltage and resonant frequency of alloy strips having the composition $Fe_{66}Co_{18}B_{15}Si_1$, a first peak crystallization temperature of about 429° C. and a saturation magnetostriction constant of about 35 ppm were measured. The strips were annealed and cooled in fifty strip lots under the conditions listed in Table 11.

TABLE 11

| RUN NO. | CONDITIONS | |
|---|---|---|
| | ANNEAL | COOL |
| 36 | 340° C./30 min | AIR |
| 37 | 340° C./30 min | LIQ. $N_2$ |
| 38 | 340° C./1 hr | AIR |
| 39 | 340° C./1 hr | LIQ. $N_2$ |
| 40 | 360° C./15 min | AIR |
| 41 | 360° C./30 min | AIR |
| 42 | 360° C./30 min | LIQ. $N_2$ |
| 43 | 360° C./1 hr | AIR |

TABLE 11-continued

| RUN NO. | CONDITIONS | |
|---|---|---|
| | ANNEAL | COOL |
| 44 | 360° C./1 hr | LIQ. N$_2$ |

The resonant frequency and output voltage were measured after heat treating. Both the pre- and post-heat treatment resonant frequency (kHz) and output voltages are listed in Table 12 below.

TABLE 12

| RUN NO. | AS-CAST FREQ. | AS/CAST OUTPUT | HEAT TREATED FREQ. | HEAT TREATED OUTPUT |
|---|---|---|---|---|
| 36 | * | 0 | 58.2 ± 1.3 | 41 ± 22 |
| 37 | * | 0 | 58.1 ± 1.3 | 37 ± 21 |
| 38 | * | 0 | 58.3 ± 1.2 | 47 ± 23 |
| 39 | * | 0 | 57.9 ± .3 | 51 ± 20 |
| 40 | * | 0 | 57.8 ± .8 | 55 ± 17 |
| 41 | * | 0 | 60.2 ± .4 | 29 ± 9 |
| 42 | * | 0 | 60.2 ± .2 | 20 ± 5 |
| 43 | * | 0 | * | 0 |
| 44 | * | 0 | * | 0 |

Alloys runs 39 through 42 having the above composition show significant improvement in resonant output voltage when heat treated according to the present invention. Alloy runs 43 and 44 were over annealed and show no output. Thus it is clear that optimum heat treatment may be achieved over a range of temperatures so long as the hold time is adjusted inversely.

EXAMPLE 10

Alloy strips were cut from ribbon having a composition Fe$_{78}$B$_{13}$Si$_9$ (first peak crystallization temperature of 553° C.). The strips were annealed in a Lindberg tube oven preheated to 465° C. for 15 minutes, removed from the oven and cooled in liquid nitrogen. The number of strips in each of the two runs, average resonant frequencies and output voltages are listed in the first two rows of Table 13 (runs 45 and 46). The resonant frequency and output voltage for as-cast alloy strips having the composition Fe$_{40}$Ni$_{38}$Mo$_4$B$_{18}$ were measured as in the previous examples and are listed in the third and fourth rows of Table 13 (runs 47 and 48 ).

TABLE 13

| Run Number | Number of Strips | Res. Freq. (kHz) | Output |
|---|---|---|---|
| 45 | 4 | 53.6 ± 0.5 | 111 ± 43 |
| 46 | 5 | 53.8 ± 0.7 | 99 ± 41 |
| 47 | 7 | 57.1 ± 0.1 | 133 ± 35 |
| 48 | 6 | 57.2 ± 0.07 | 152 ± 4 |

The heat treated alloy strips having the composition Fe$_{78}$B$_{13}$Si$_9$ were chemically etched in a 20% nital solution at room temperature for 30-60 seconds. Alloys strips having the composition Fe$_{40}$Ni$_{38}$Mo$_4$B$_{18}$ were etched in a 50% acetic acid −50% nitric acid solution for 5-12 seconds. The alloy strips were removed from the etching baths, rinsed and dried. The weight percent removed by etching was 10.4 weight %, 5.6 weight %, 11.2 weight % and 4.8 weight percent for runs 45-48 respectively. The resonant frequency and output voltage were measured again. The results are shown in Table 14, below.

TABLE 14

| Run Number | Number of Strips | AFTER | |
|---|---|---|---|
| | | Res. Freq. (kHz) | Output |
| 45 | 4 | * | 0 |
| 46 | 5 | * | 0 |
| 47 | 7 | 56.9 ± 0.2 | 149 ± 22 |
| 48 | 6 | 57.2 ± 0.05 | 143 ± 20 |

By comparing the results listed in tables 13 and 14, it is clear that the decrease in output voltage to zero displays by runs 45 and 46 after etching can be attributed to removal of the surface crystallized layer. However, chemically etching samples 47 and 48 resulted in only a small change in the output voltage because the structure of the alloy (amorphous) is essentially unchanged by etching. The etching results support the theory that the properties which are enhanced by heat treatment according to the present invention are the result of interaction between crystallization-induced stresses and the positive magnetostriction constant of the alloy.

EXAMPLE 11

Alloy strips having the compositions and first peak crystallization temperatures, $T_x$, listed below were annealed in five strip lots according to the conditions listed in Table 15 below. The saturation magnetostriction constants for runs 49 through 51 were given in the previous examples. The saturation magnetostriction constants for the alloy having the composition Fe$_{77}$Cr$_2$B$_{16}$Si$_{4.75}$C$_{0.25}$ (run 52) is about 20 ppm. The alloy having the composition Fe$_{81}$B$_{13.5}$Si$_{3.5}$C$_2$ (runs 53-54) have a saturation magnetostriction constant of about 30 ppm.

TABLE 15

| Run No. | Alloy Comp. | T$_{x1}$ (°C.) | Annealing Cond. |
|---|---|---|---|
| 49 | Fe$_{40}$Ni$_{38}$Mo$_4$B$_{18}$ | 439 | As Cast |
| 50 | Fe$_{40}$Ni$_{38}$Mo$_4$B$_{18}$ | 439 | 460° C./1 hr water |
| 51 | Fe$_{79.7}$B$_{10.9}$Si$_{9.4}$ | 515 | 420° C./2 hr air |
| 52 | Fe$_{77}$Cr$_2$B$_{16}$Si$_5$C$_{0.25}$ | 535 | 440° C./1 hr liq N$_2$ |
| 53 | Fe$_{81}$B$_{13.5}$Si$_{3.5}$C$_2$ | 509 | 440° C./½ hr air |
| 54 | Fe$_{81}$B$_{13.5}$Si$_{3.5}$C$_2$ | 509 | As Cast |
| 55 | Fe$_{79.8}$B$_{10.9}$Si$_{9.3}$ | 513 | As Cast |

The resonant frequency and output voltage of the alloy strips were measured. Resonant output voltage was measured two ways, according to the procedure described in Example 1 (listed as V$_2$), and by placing the alloy strip in a sensing coil having 221 turns within an exciting coil having 180 turns. An ac magnetic field was applied along the longitudinal direction of each alloy strip with a dc biasing field of about 345 A/m. The voltage across the excitation coil was 0.8 V$_{rms}$, which was supplied in pulse, 2.5 msec on, and 7.5 msec off. The sensing coil detected the magnetomechanical response of the alloy strip to the ac excitation. Resonant output voltage measurements taken by this technique are in volts (peak), and are listed as V$_2$ in column 3 Table 16. The resonant output voltage was measured 1 msec after the termination of the exciting field, using the testing conditions as in the previous examples, and is listed as V$_1$ in the last column of Table 16. Resonant frequency (kHz) corresponding to the maximum output voltage was measured using both testing methods, and is listed in columns 2 and 4 of Table 16.

TABLE 16

| Run No. | $f_{r2}$ | $V_2$ (Volts) | $f_{r1}$ | $V_1$ |
|---|---|---|---|---|
| 49 | 57.1 ± 0.1 | 0.34 ± 0.04 | 57.3 ± 0.04 | 151 ± 18 |
| 50 | 61.1 ± 0.1 | 0.43 ± 0.04 | 61.2 ± 0.2 | 187 ± 13 |
| 51 | 58.6 ± 0.8 | 0.48 ± 0.04 | 58.6 ± 0.9 | 193 ± 17 |
| 52 | 59.1 ± 0.2 | 0.53 ± 0.06 | 57.9 ± 0.1 | 180 ± 28 |
| 53 | 58.4 ± 0.4 | 0.40 ± 0.08 | 58.2 ± 0.1 | 163 ± 30 |
| 54 | 57.7 ± 0.2 | 0.02 | * | 0 |
| 55 | 55.3 ± 0.2 | 0.02 | * | 0 |

Alloy runs 50, 51 and 53 having the above-recited compositions and heat treated according to the process of the present invention displayed increased resonant output voltages over non-heat treated alloys of the same composition (alloy runs 49, 55) and similar compositions alloy run 54). Alloy run 52 also displayed high output upon heat treatment. The increases in output voltage are shown for measurements taken via either method. The slight difference in the resonant frequencies may be attributed to the fact that the excitation frequency is varied in increments of 0.1 kHz for the resonant frequency measurements listed under $f_{r2}$ in Table 16, and is varied manually for the resonant frequency measurements listed under $f_{r1}$. The consistency between the resonant frequencies measured by the two techniques indicates that unitless output voltages which were observed are valid measurements for comparison.

EXAMPLE 12

The average resonant frequencies (kHz) and output voltages (unitless) of alloy strips having the composition $Fe_{40}Ni_{38}Mo_4B_{18}$ and measuring 1.5 inches by 0.5 inches were measured and are listed in the second and third columns of Table 17 respectively. The strips were annealed in 50 strip runs. The strips were placed in a Blue M oven, which was heated to the annealing temperature of 460° C. in one hour, held at the annealing temperature for 1 hour and cooled to room temperature at a rate of 6° C./minute. The average resonant frequencies (kHz) and output voltages were measured and are listed in the fourth and fifth columns of Table 17, below.

TABLE 17

| | AS-CAST | | ANNEALED | |
|---|---|---|---|---|
| RUN NO. | $f_r$ | $V_1$ | $f_r$ | $V_1$ |
| 56 | 57.4 ± 0.1 | 161 ± 6 | 61.4 ± 0.5 | 24 ± 11 |
| 57 | 57.3 ± 0.1 | 162 ± 6 | 62.1 ± 0.6 | 8 ± 8 |
| 58 | 57.4 ± 0.1 | 160 ± 8 | 61.5 ± 0.5 | 24 ± 8 |

The alloy strips were then heat treated in a Lindberg tube oven which was preset to 460° C., heated for the time (hold-time) listed in the second column of Table 18 and water cooled. The average resonant frequency (kHz) and output voltages are listed in Table 18 below.

TABLE 18

| RUN NO. | HOLD-TIME | $f_r$ | $V_1$ |
|---|---|---|---|
| 56 | 0 MIN | 60.8 ± 0.5 | 30 ± 10 |
| 57 | 30 MIN | 62.0 ± 0.3 | 118 ± 39 |
| 58 | 60 MIN | 62.6 ± 0.1 | 146 ± 23 |

Comparing the output voltages listed in Table 18, it is clear that longer annealing times (run 58) produced alloy strips having higher output voltages. Comparison of the output voltages of Table 18 with those listed in Table 17 showed that the heat treatment of the present invention may be used to increase the output voltage of preannealed alloys.

EXAMPLE 13

The dc loop properties of several alloys were measured using a Magnos MTS-2A hysteresisgraph. Table 17 lists the sample number, aloy composition, annealing conditions, form and dimensions for the appropriate dc loop.

TABLE 19

| Sample No. | Alloy Comp. | Form | Dimen. | heat treatment Cond. |
|---|---|---|---|---|
| A | $Fe_{40}Ni_{38}Mo_4B_{18}$ | strip | 8" × 1" | AS CAST |
| B | $Fe_{40}Ni_{38}Mo_4B_{18}$ | wound core | ID = 1.9 cm OD = 2.23 cm 10 g | AS CAST |
| C | $Fe_{40}Ni_{38}Mo_4B_{18}$ | wound core | ID = 1.9 cm OD = 2.23 cm 10 g | 260° C./ 1 hr 6° C./min |
| D | $Fe_{40}Ni_{38}Mo_4B_{18}$ (nanocryst) | wound core | ID = 4.06 cm OD = 4.26 cm 10 g | 460° C./ 1 hr 6° C./min |
| E | $Fe_{40}Ni_{38}Mo_4B_{18}$ (nanocryst) | wound core | ID = 4.06 cm OD = 4.26 cm 10 g | 460° C./ 30 min air cool |
| F | $Fe_{40}Ni_{38}Mo_4B_{18}$ (nanocryst) | wound core | ID = 1.9 cm OD = 2.23 cm 10 g | 460° C./ 45 min liq. $N_2$ |
| G | $Fe_{78}B_{13}Si_9$ | wound core | ID = 1.9 cm OD = 2.3 cm 10 g | 460° C./ 30 min 6° C./min |
| H | $Fe_{78}B_{18}Si_9$ | wound core | ID = 1.9 cm OD = 2.3 cm 10 g | 460° C./ 30 min liq. $N_2$ |
| I | $Fe_{79.7}B_{10.9}Si_{9.4}$ | wound core | ID = 1.9 cm OD = 2.3 cm 10 g | 420° C./ 2 hrs liq. $N_2$ |

Figure 2:
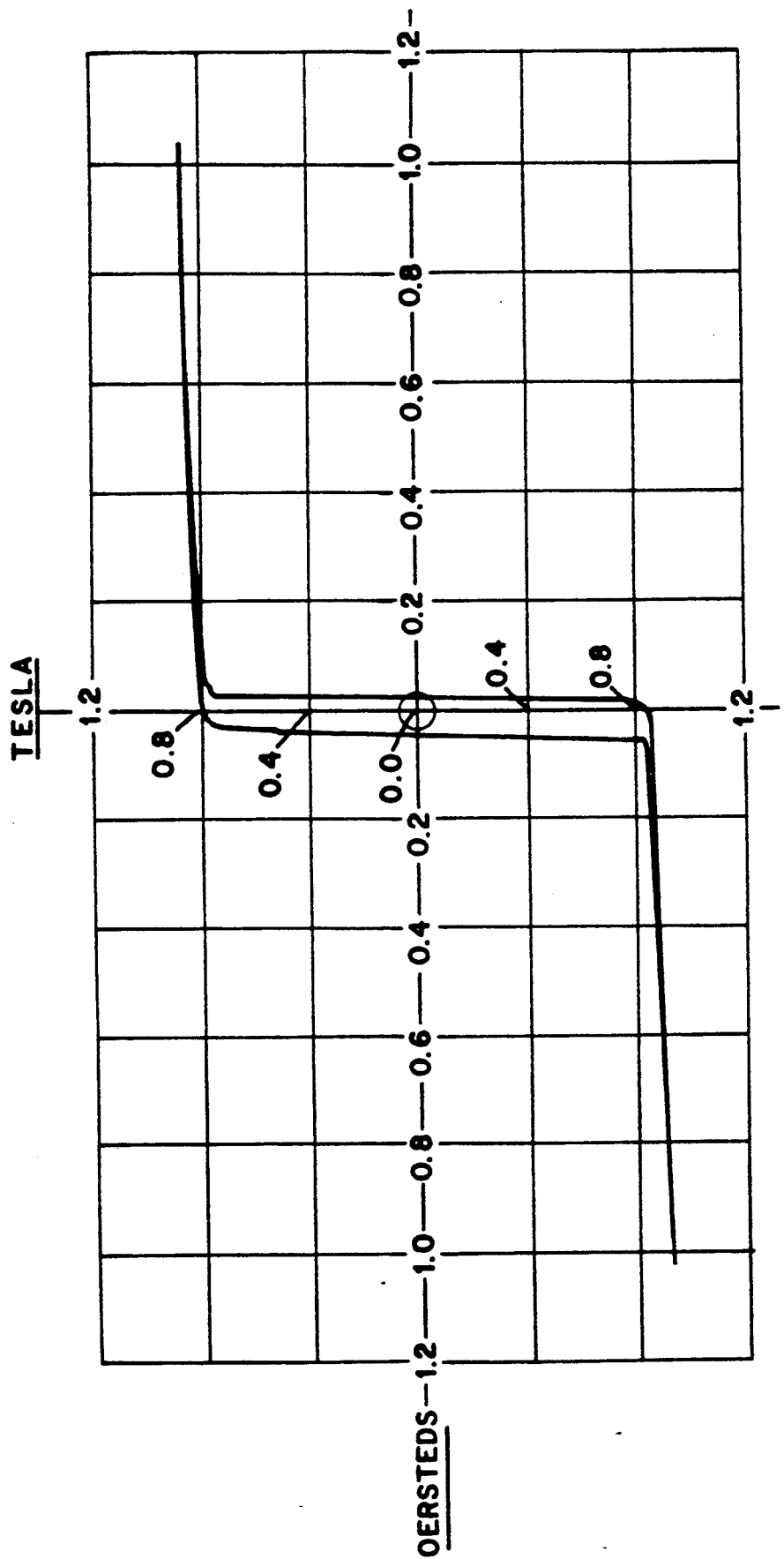
FIG. 2 is the dc loop of a wound core made from as-cast alloy having the composition $Fe_{40}Ni_{38}Mo_4B_{18}$.
Figure 3:
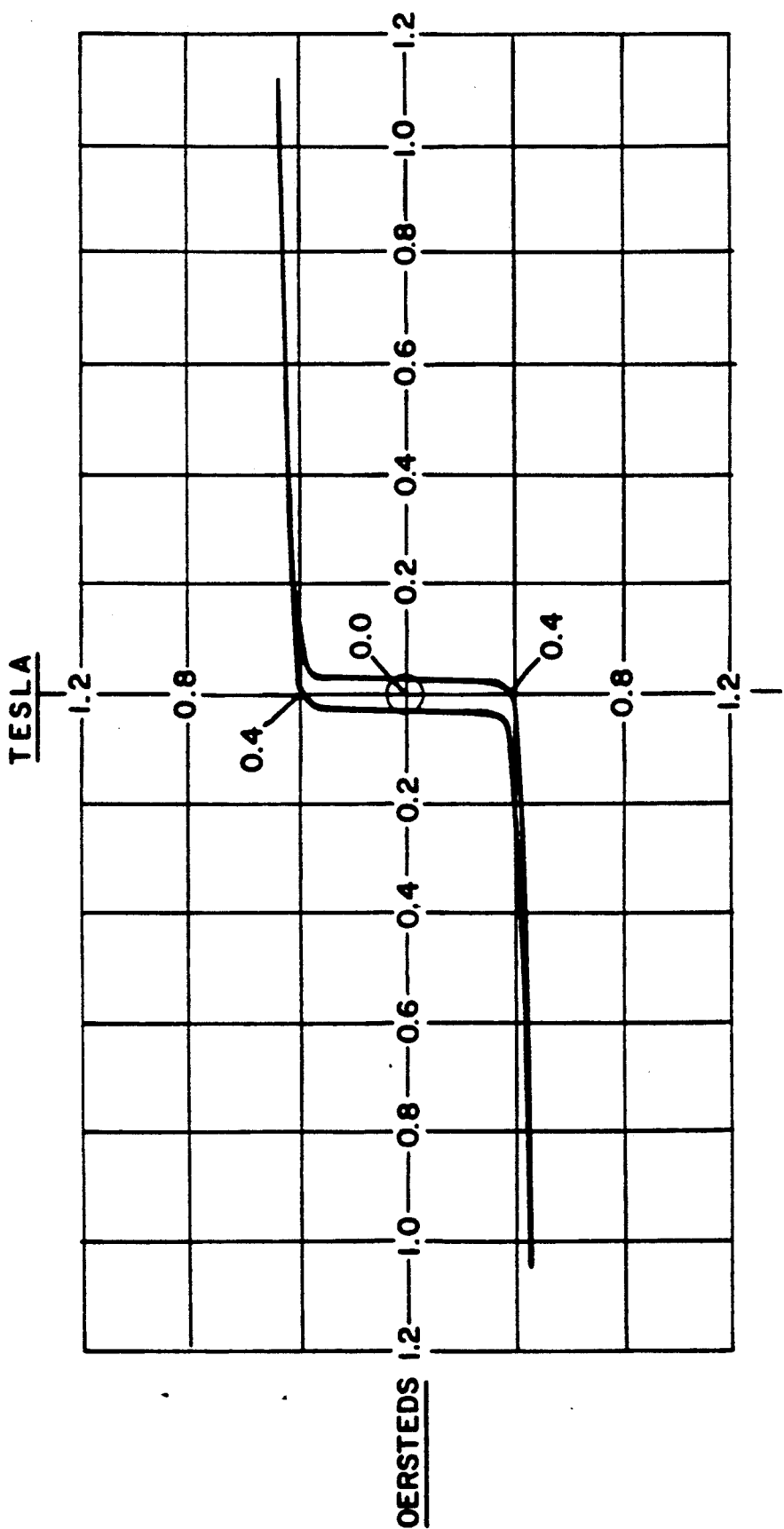
FIG. 3 is the dc loop of the wound core of FIG. 1 which was stress-relief annealed at 260° C. for 1 hour and then cooled at a rate of 6° C./min (conventional cooling rate).

FIG. 1 shows the hysteresis loops taken at 80 and 800 A/m (1 and 10 Oe respectively) for Sample A (an alloy strip having the nominal composition $Fe_{40}Ni_{38}Mo_4B_{18}$ and measuring about 8 inches by about 0.5 inches, which is longer than the sensing coil. Each of the two loops in FIG. 1 displays dc B-H loops which have discontinuous changes in the loop (marked "a" and "b") at near zero field conditions (the circled region), and is pinched or narrow about the origin (marked "c"). The pinching about the origin is particularly distinct in the bottom loop of FIG. 1. FIG. 2 shows the hysteresis loop traced at 80 A/m (1 Oe) for Sample B (as cast wound core). The dc minor loop is rather square, does not show any discontinuity at near zero field conditions and does not display any pinching about the origin. FIG. 3 shows the dc hysteresis loops for Sample C (a wound core of the same alloy as Samples A and B) which was stress relief annealed at 260° C. for 1 hour and cooled at 6° C./minute (conventional cooling) rate. The loop was taken in an 80 A/m (1 Oe) drive field. The loop of FIG. 3 displays neither a discontinuous change in the loop nor any pinching about the origin.

Figure 4:
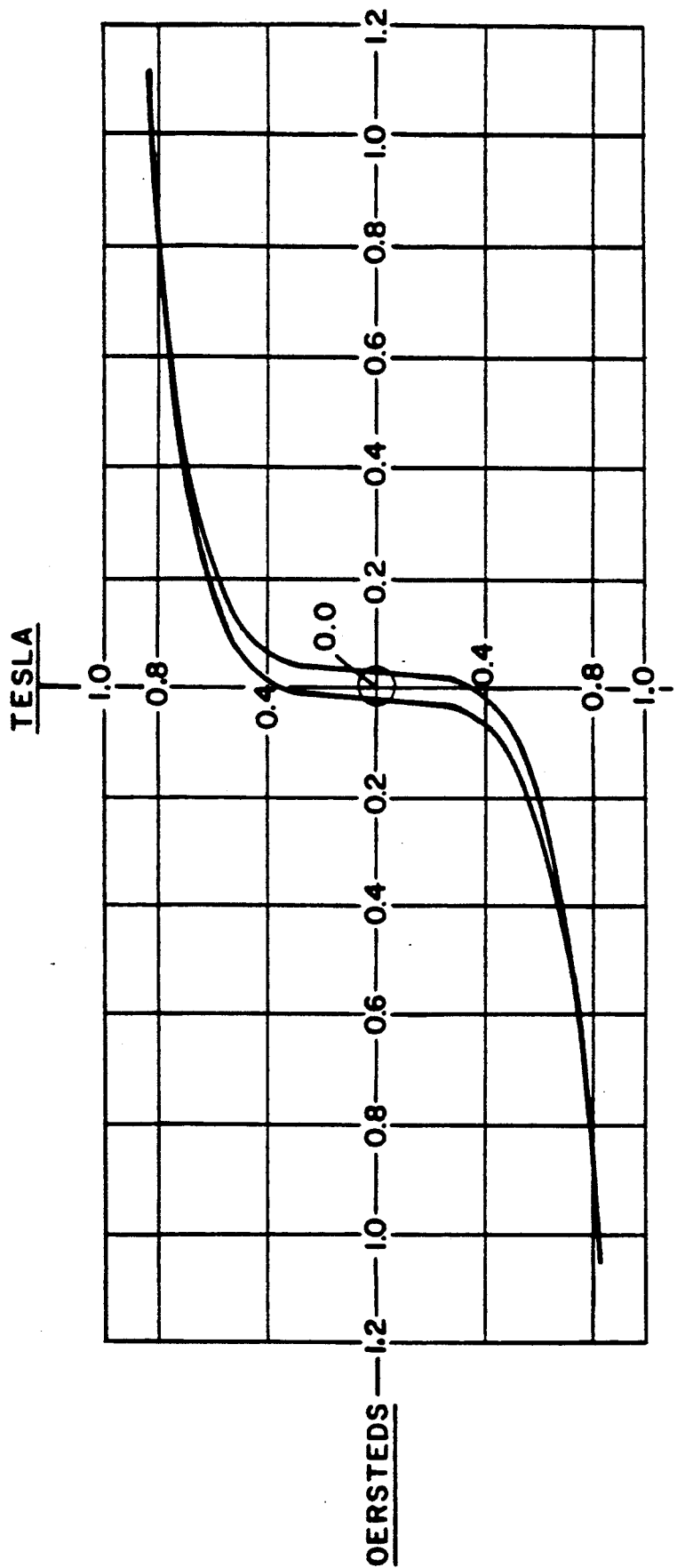
FIG. 4 displays the dc loop of a wound core made from $Fe_{40}Ni_{38}Mo_4B_{18}$ which was annealed at 460° C. for 1 hour and then cooled at 6° C./min. (conventional cooling rate).
Figure 5:
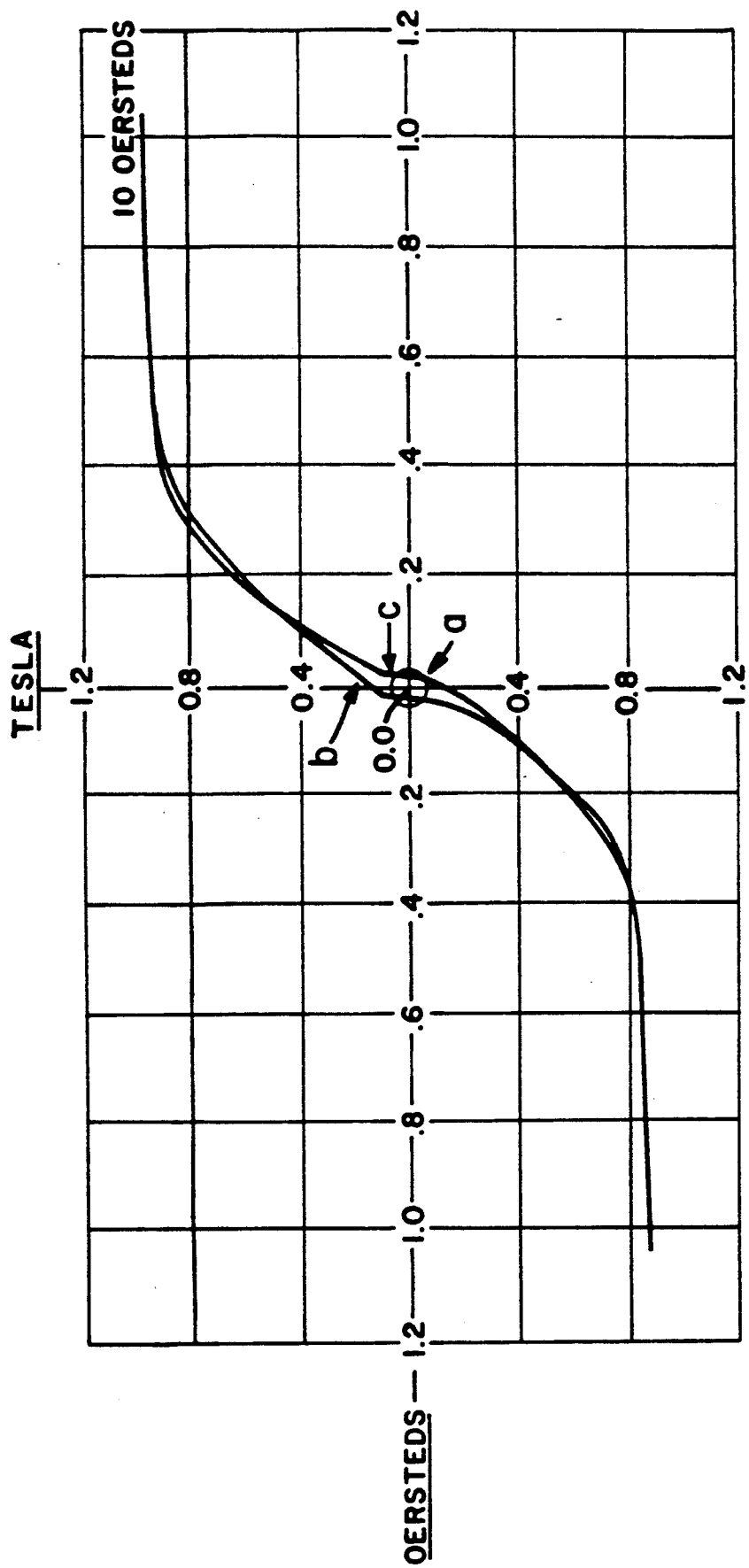
FIG. 5 displays the dc loop of a wound core made from $Fe_{40}Ni_{38}Mo_4B_{18}$ which was annealed at 460° for ½ hour and then quick cooled in air.
Figure 6:
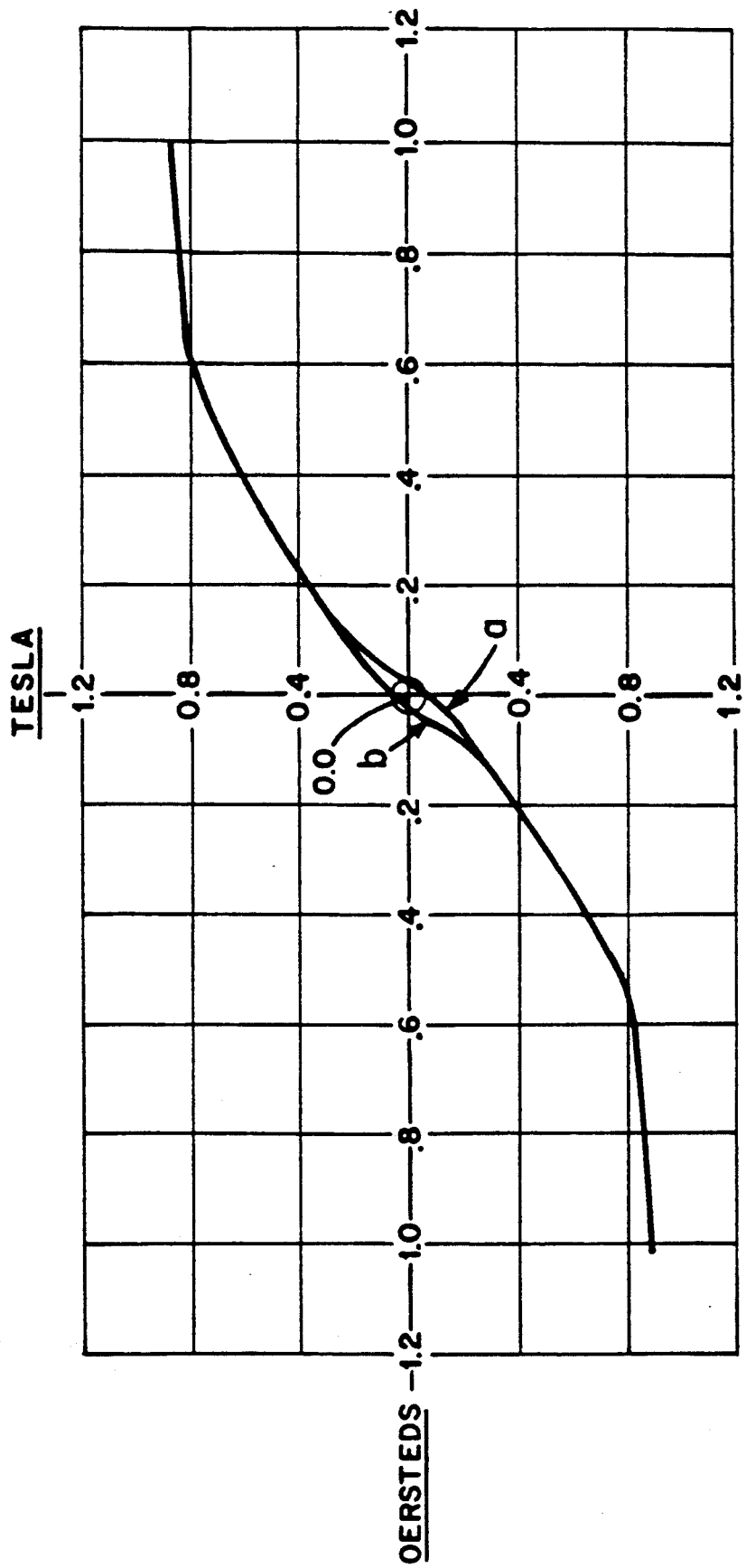
FIG. 6 displays the dc loop of a wound core made from $Fe_{40}Ni_{38}Mo_4B_{18}$ which was annealed at 460° for 45 minutes and then quick cooled in liquid nitrogen.

FIGS. 4 through 6 (Samples D through F respectively) show the hysteresis loops for wound cores having the same composition as Samples A through C, but with nanocrystalline structure. Each of the cores was heat treated at different annealing and cooling conditions. FIG. 4 (conventionally cooled nanocrystalline core) shows a hysteresis loop taken at 80 A/m (1 Oe) having a smooth changes from the higher field conditions to the near zero field conditions without any discontinuities or pinching about the origin. Both FIGS. 5 and 6 (B-H loops for heat treated nanocrystalline cores taken at 800 A/m or 10 Oe) show sudden discontinuous changes in the loop at the near zero field conditions (marked "a" and "b") and FIG. 5 shows pinching about the origin (marked "c").

Figure 7:
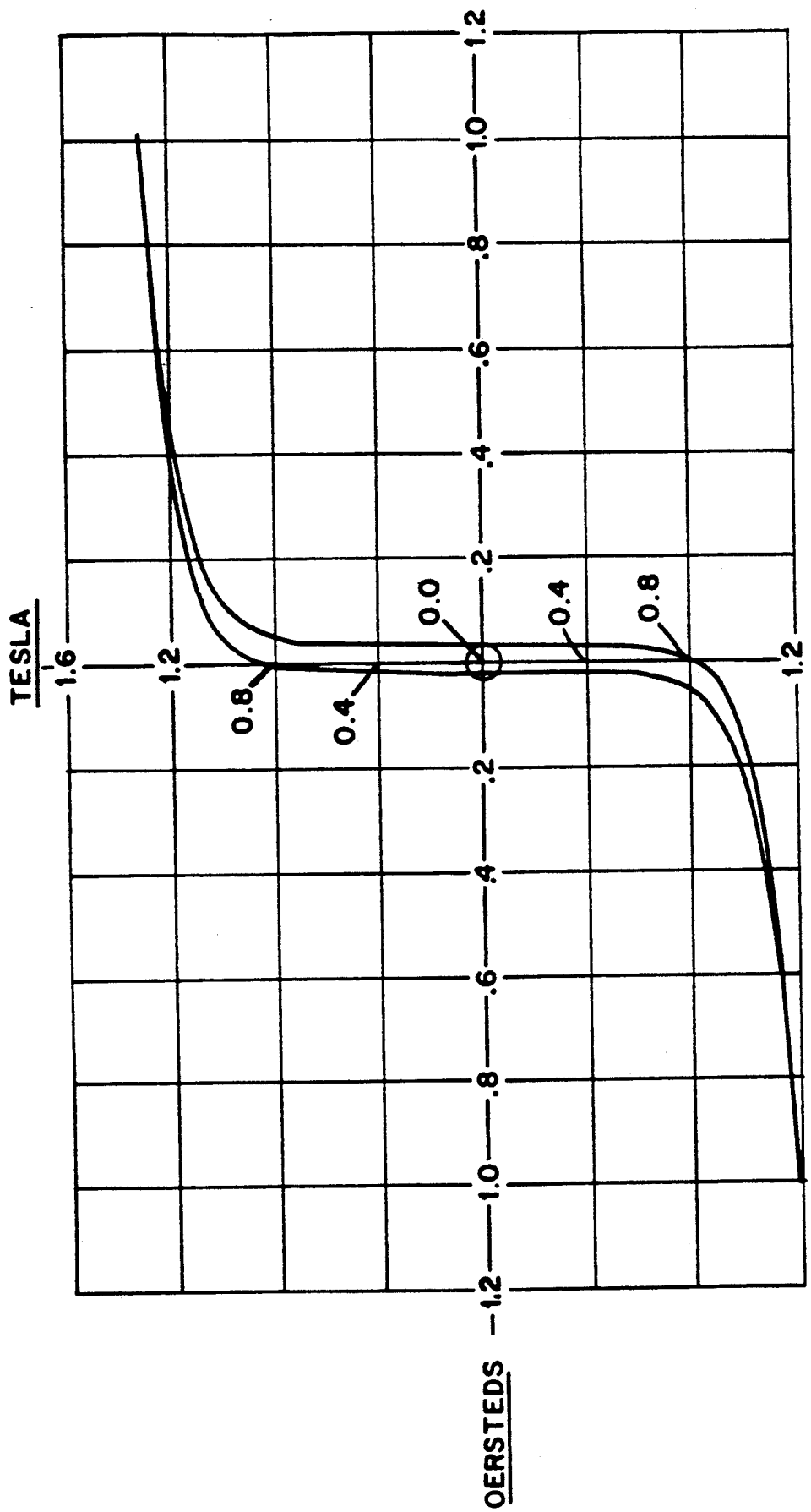
FIG. 7 is the dc loop of a wound core made from an alloy having the composition $Fe_{78}B_{13}Si_9$, which was annealed at 460° C. for 30 minutes, and cooled at 6° C./minute (conventional cooling rate).
Figure 8:
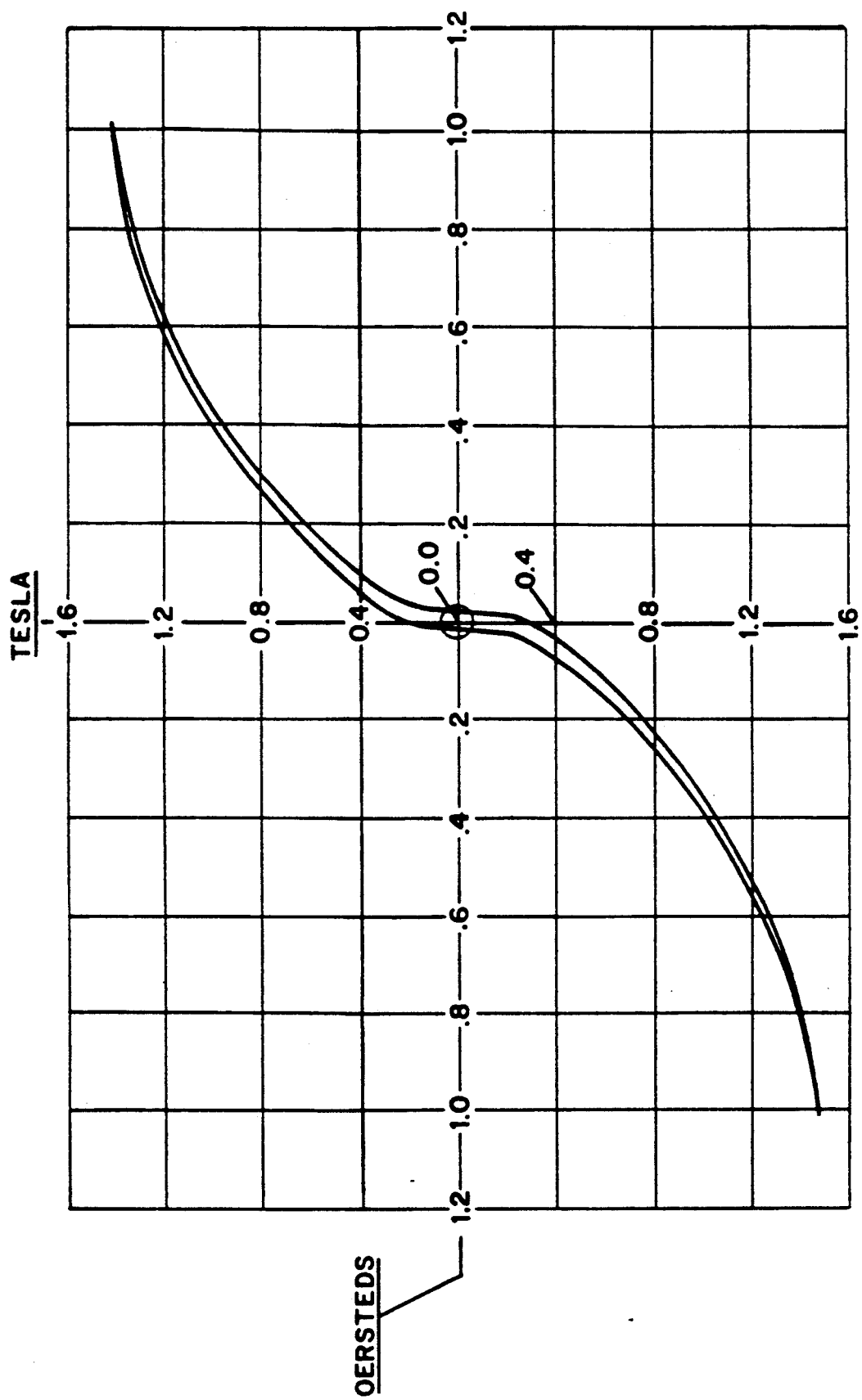
FIG. 8 is the dc loop of a wound core made from an alloy having the composition $Fe_{78}B_{13}Si_9$, which was annealed under the same conditions as the alloy whose dc loop is shown in FIG. 7; but was cooled in liquid nitrogen according to the present invention.

FIGS. 7 and 8 show the B-H loop for alloys having the same composition ($Fe_{78}B_{13}Si_9$) which were annealed at the same conditions but, respectively, cooled conventionally and according to the present invention. The hysteresis loop of FIG. 7 (80 A/m or 1 Oe) is 8 (taken at 800 A/m or 10 Oe) shows a hysteresis loop smooth and shows no discontinuities or pinching. FIG. having discontinuities "a" and "b" at near zero field conditions.

Figure 9:
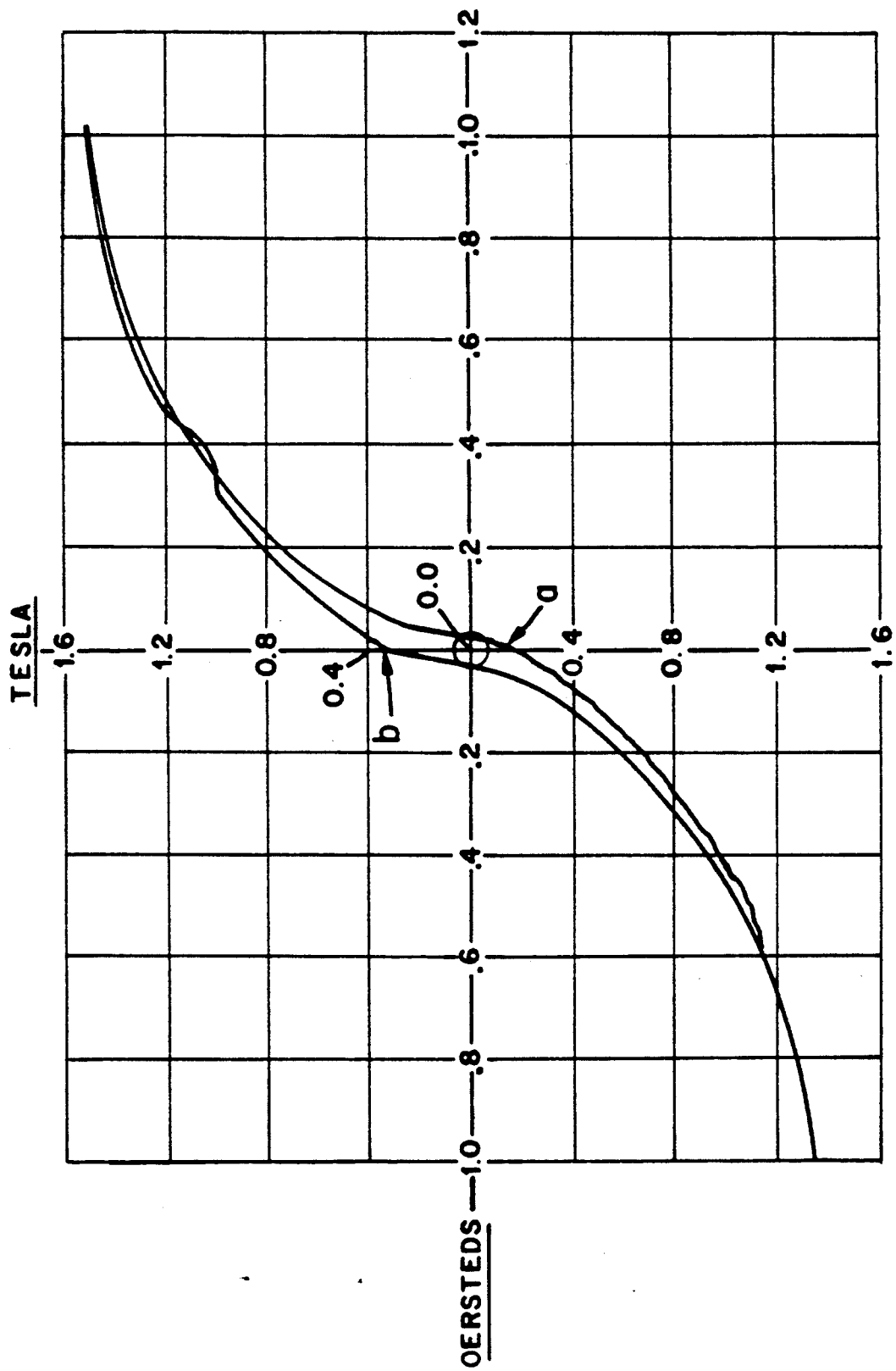
FIG. 9 displays the dc loop for a wound core made from an alloy having the composition $Fe_{79.7}B_{10.9}Si_{9.4}$, which was annealed at 420° C. for 2 hours and then quick cooled in liquid nitrogen.

FIG. 9 shows the hysteresis loop for a core having the composition $Fe_{79.7}B_{10.9}Si_{9.4}$ which was heat treated according to the present invention (Samples I). The hysteresis loop of FIG. 9 (taken at 800 A/m or 10 Oe) displays discontinuities "a" and "b" at near zero field conditions, indicating that the alloy has been heat treated according to the present invention.

The core loss for core I was measured and found to be 21 W/kg at 100 kHz/0.1T. The core loss for a core made from the as-cast alloy which was annealed to obtain a square dc loop was about 180 W/kg at the same conditions (100 kHz/0.1T), as reported in Metglas Products Technical Brochure, "Metglas Magnetic Alloys Technically Superior", pg 14. Thus, heat treating according to the present invention also greatly improves the core loss of the resulting cores, and produces core which have particular utility as high frequency transformers.

EXAMPLE 14

Cores having an inner diameter of 1.88 cm, an outer diameter of 2.05 cm and a height of 1.27 cm (5 g) were made from alloy ribbon having the nominal composition $Fe_{40}Ni_{38}Mo_4B_{18}$. Two of the cores were heat treated at the conditions listed in Table 17, below.

TABLE 17

| Sample No. | Annealing Cond. | Cooling Cond. |
|---|---|---|
| L | none | none |
| M | 460° C./1 hr | Liq. N₂ |
| N | 460° C./1 hr | water |

The permeability of each core was measured using a HP4192A LF Impedance Analyzer with a drive field adjusted to obtain a B=0.5 mT. The permeability graphs are shown in FIG. 10. The permeability for core L (as-cast) is low, but constant. The permeability graph for cores M and N, which were optimally heat treated displays much higher, and essentially constant permeability up to about 1 MHz. Thus it is obvious from FIG. 10 that heat treatment according to the present invention has a dramatic effect upon the permeability of the cores. Cores M and N could be used independently or coupled with a core having high permeability at lower frequencies to make a composite core, as an EMI filter.

EXAMPLE 15

Alloy ribbon having the nominal composition $Fe_{79.7}B_{10.9}Si_{9.4}$ was wound into a core having outer diameter of 2.05 cm, inner diameter of 1.88 cm and a height of 1.27 cm (5 g). The core was annealed in a Lindberg oven which was preheated to 420° C. for 2 hours, and cooled in liquid nitrogen. The permeability was measured as in the previous example and is shown in FIG. 11 as a plot of permeability versus frequency. The core also displays essentially constant permeability up to about 1 MHz. Thus cores made from the alloy $Fe_{79.7}B_{10.9}Si_{9.4}$ and heat treated according to the present invention may be used as an EMI filter, either alone or in combination with a core having high permeability at lower frequencies.

I claim:

1. A process comprising the steps of:
   providing a metal strip of a positive magnetostrictive alloy having at least one crystallization temperature and an essentially surface crystalline phase defining a major surface of said strip and an amorphous phase contiguous with said crystalline phase and remote from said major surface;
   heating said metal strip to a temperature between about 70% and about 99% of the first crystallization temperature; and
   cooling said heated metal strip at a rate greater than about 10° C./min.

2. The process of claim 1 wherein said heat treated metal strip displays a B-H loop which has an abrupt change in slope at near zero field conditions.

3. The process of claim 1 wherein said metal strip is annealed at a temperature between about 80% and about 90% of first crystallization temperature.

4. The process of claim 1 wherein said cooling is carried out at a rate of at least 50° C./min.

5. The process of claim 1 wherein said cooling is carried out at a rate of at least 100° C./min.

6. A process comprising the steps of:
   providing a core comprising an annealed amorphous alloy ribbon having a surface crystalline phase and a bulk amorphous phase;
   heating said core to a temperature between about 70% and about 99% of a first crystallization temperature of the amorphous alloy; and
   cooling said heat treated core so that said core displays a pinched B-H loop.

7. The process of claim 6 wherein said cooling is carried out at a rate of at least 10° C./min.

8. The process of claim 6 wherein said cooling is carried out at a rate of at least 50° C./min.

9. The process of claim 6 wherein said cooling is carried out at a rate of at least 100° C./min.

* * * * *